United States Patent [19]

Sato et al.

[11] Patent Number: 4,835,677
[45] Date of Patent: May 30, 1989

[54] SYSTEM FOR DIRECTLY AND INDIRECTLY ACCESSING CONTROL REGISTERS BY DIFFERENT OPERATING SYSTEMS BASED UPON VALUE OF OPERATING SYSTEM INDICATION BIT

[75] Inventors: Kiyosumi Sato; Yoshihiro Mizushima, both of Kawasaki; Katsumi Ohnishi, Kawagoe; Motokazu Kato, Sagamihara; Toshio Matsumoto, Kawasaki, all of Japan

[73] Assignee: Fujitsu Limited, Kawasaki, Japan

[21] Appl. No.: 8,155

[22] Filed: Jan. 21, 1987

Related U.S. Application Data

[63] Continuation-in-part of Ser. No. 535,695, Sep. 26, 1983, abandoned.

[30] Foreign Application Priority Data

Sep. 30, 1982 [JP] Japan ................. 57-172105

[51] Int. Cl.⁴ ............... G06F 13/38; G06F 9/22; G06F 9/44; G06F 9/46
[52] U.S. Cl. ............................. 364/200
[58] Field of Search ... 364/200 MS File, 900 MS File, 364/300

[56] References Cited

U.S. PATENT DOCUMENTS

| 4,177,510 | 12/1979 | Appell et al. | 364/200 |
|-----------|---------|---------------|---------|
| 4,205,370 | 5/1980 | Hirtle | 364/200 |
| 4,251,862 | 2/1981 | Murayama | 364/200 |
| 4,400,769 | 8/1983 | Kaneda et al. | 364/200 |
| 4,414,622 | 11/1983 | Matsumoto | 364/200 |
| 4,434,464 | 2/1984 | Suznki et al. | 364/200 |
| 4,493,034 | 1/1985 | Angelle et al. | 364/200 |
| 4,494,189 | 1/1985 | Bean et al. | 364/200 |
| 4,519,033 | 5/1985 | Vaughn et al. | 364/200 |
| 4,530,052 | 7/1985 | King et al. | 364/200 |
| 4,533,996 | 8/1985 | Hartung et al. | 364/200 |

OTHER PUBLICATIONS

Comcon '81-Digest of Papers, 23rd-26th Feb. 1981, pp. 229-234, IEEE, New York, USA, S. Takahashi et al.: "An In-Line Virtual Machine Facility".
IBM Technical Disclosure Bulletin, vol. 21, No. 2, Jul. 1978, pp. 456-457, New York, R. E. Birney: "Program-assigned hardwired supervisor call instructions".
IBM Technical Disclosures Bulletin, vol. 25, No. 2, Jul. 1982, pp. 650-652, New York, H. Chilinski et al.: "Microprogram Support for changed or erroneous hardware-controlled computer functions (escape · functions)".
European Search Report (English Translation), The Hague, 4-1-84.

Primary Examiner—Archie E. Williams, Jr.
Assistant Examiner—Thomas C. Lee
Attorney, Agent, or Firm—Staas & Halsey

[57] ABSTRACT

A data processing system comprising at least two operating systems (OS1, OS2) for virtual machines, a supervisory operating system, i.e., a control program (CP) for controlling the operating systems, control registers (CR0, CR1, ---) and an extended control register (ECR) having a special bit. When a control register operating instruction (LCTL or STCTL) is executed by one of the operating systems, the special bit has a first value and the operating system directly accesses the control register. When the other of the operating systems attempts to execute such a control register operating instruction, the special bit has a second value and an interruption is generated in the supervisory operating system.

2 Claims, 3 Drawing Sheets

SYSTEM FOR DIRECTLY AND INDIRECTLY ACCESSING CONTROL REGISTERS BY DIFFERENT OPERATING SYSTEMS BASED UPON VALUE OF OPERATING SYSTEM INDICATION BIT

This is a continuation of co-pending application Ser. No. 535,695, filed on Sept. 26, 1983, now abandoned.

BACKGROUND OF THE INVENTION

1. Field of the Invention

The present invention relates to a data processing system with virtual machines. More particularly, it relates to the determination of execution of control register load/store control instructions, by hardware in the system.

2. Description of the Prior Art

Large-scale computer systems frequently utilize the concept of virtual machines. Such systems are provided with a plurality of operating systems for controlling the virtual machines and with a supervisory operating system, i.e., a control program. The control program runs an actual machine, while the operating systems run under the control program.

Such a system may, for example, be provided with 16 ($2^4$) control registers, if four-bits are provided in an instruction for selecting the control registers. Not all the 16 control registers, however, are initially defined and only the initially defined control registers may be repeatedly provided in the hardware of the system. As a result, when a new function is added, it is necessary to change the hardware if additional control registers are required.

Various proposals have been made to allow additional control registers to be defined in a main memory storage without adding hardware. However, such additional control registers cannot be accessed directly by the operating systems. Therefore, when any one of the operating systems generates a control register operating instruction such as a load instruction or a store instruction, an interruption is generated in the control program and control is transferred from the operating systems to the control program. In other words, such a control register operating instruction is simulated by the control program. This, however, increases the overhead time of the system.

SUMMARY OF THE INVENTION

It is an object of the present invention to provide a data processing system with virtual machines in which the overhead time is reduced.

According to the present invention, each virtual machine, i.e., each operating system, is identified by a special bit of an extended control register. If the special bit has a first value corresponding to the operation one of the virtual machines, a control register operating instruction is performed directly by hardware or firmware. If the special bit has a second value corresponding to the other of the virtual machines, the instruction is not performed directly by hardware rather the instruction is simulated by control program. As a result, the control register operating instruction is performed by hardware alone for some operating systems. This reduces the overall overhead time.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENT

Figure 1:
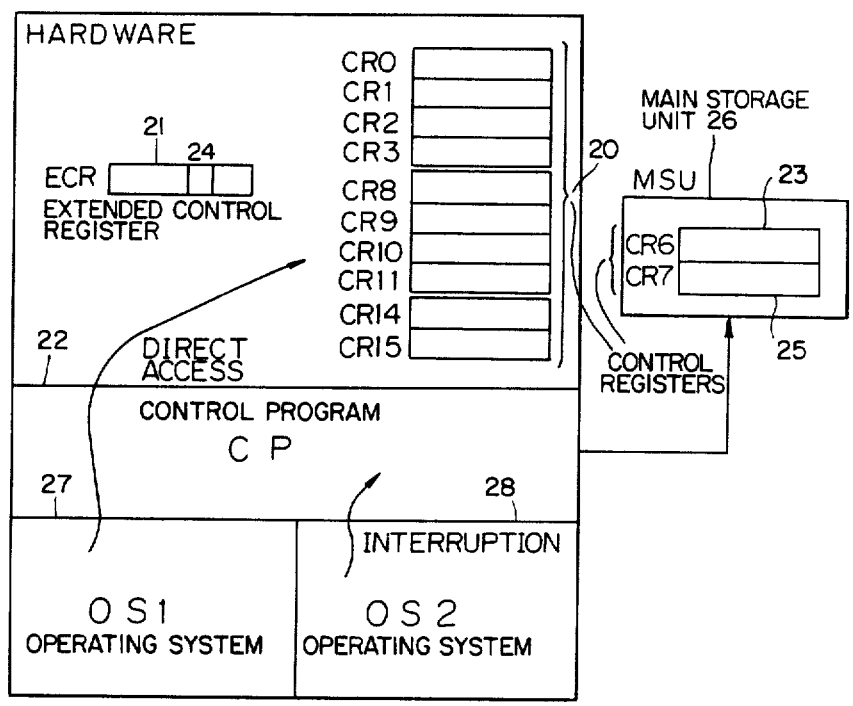
FIG. 1 is a block diagram of an embodiment of a data processing system according to the present invention.

In FIG. 1, which illustrates an embodiment of the present invention, control registers 20 individually identified CR0, CR1, CR2, CR3, CR8, CR9, CR10, CR11, CR14 and CR15 are provided in hardware. As explained above, in a large machine, since four bits are provided for selecting the control registers in an instruction, 16 ($2^4$) control registers can be provided. In this case, control registers CR4, CR5, CR7, CR12, and CR13 are not separately provided in the hardware. The above-mentioned control registers, may store a mask bit for an external interruption, a mask bit for a machine check interruption, dynamic address translation (DAT) control information, a dual address space (DAS) control information, program event recording (PER) control information, virtual machine (VM) assist control information, and the like.

Reference numeral 21 designates an extended control register (ECR) controlled by a control program (CP) 22. The control program CP, called a supervisor, supervises operating systems (OS1) 27 and (OS2) 28. In this embodiment, the operating system OS1 uses the control registers CR0, CR1, CR2, CR3, CR8, CR9, CR10, CR11, CR14, and CR15 while the operating system OS2 uses control registers (CR6) 25 and (CR7) 26 in addition to the above-mentioned control registers. In this case, the additional control registers CR6 and CR7 are provided in a main storage unit (MSU) 23. When the operating system OS1 27 runs, the control program CP sets bit 24 of the extended control register ECR to the value "0". When the operating system OS2 28 runs, the control program CP sets bit 24 of the extended control register ECR to the value "1".

In the present invention, when the operating system OS1 generates a load control (LCTL) instruction or a store control (STCTL) instruction, these instructions are directly carried out. However, when the operating system OS2 executes such an instruction, an interruption is generated for the control program CP, which then, in turn, carries out the instruction. This differs from the prior art in which even when the operating system OS1 executed an instruction, an interruption was generated in the control program CP and the instruction was carried out by the control program CP.

Figure 2:
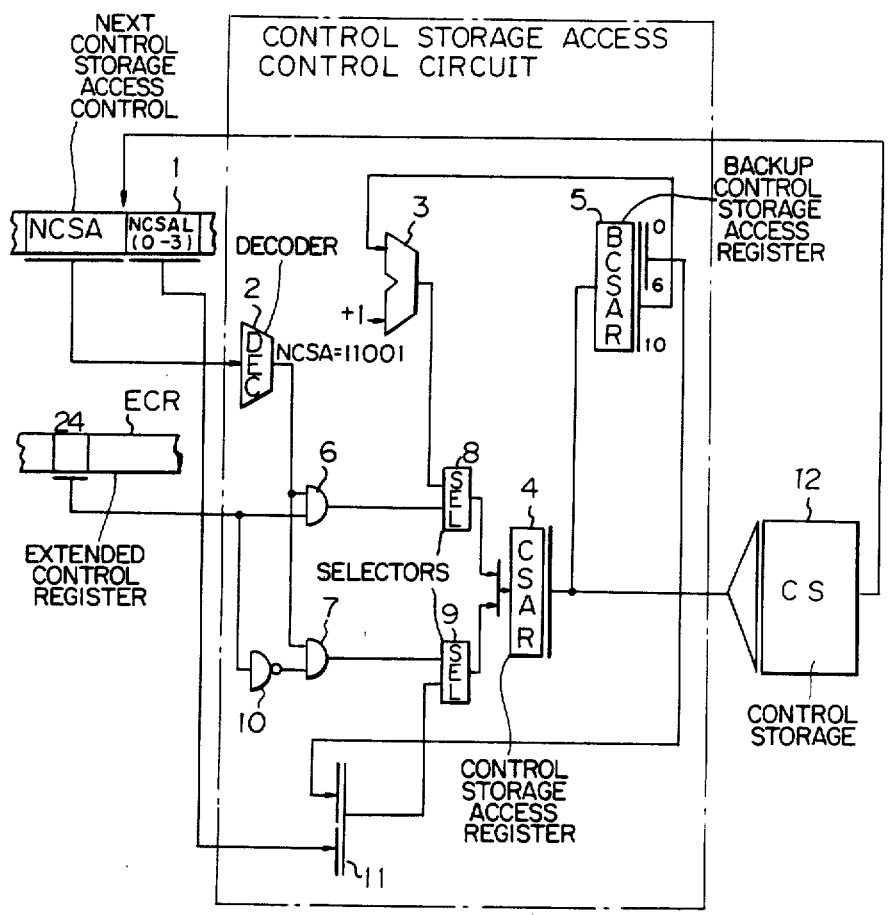
FIG. 2 is a block diagram of a control storage access control circuit according to the present invention.

In FIG. 2, which illustrates a control storage access control circuit according to the present invention, reference numeral 1 designates a microinstruction register, 2 a decoder, 3 an adder, 4 a control storage address register, 5 a backup control storage address register, 6 and 7 AND circuits, 8 and 9 select circuits, 10 a NOT circuit, 11 a bus and 12 a control storage. NCSA is an abbreviation for "next control storage address control", and NCSAL is an abbreviation for "next control storage address low."

When a microinstruction corresponding to an LCTL or STCTL instruction is stored in the microinstruction register 1, the content of NCSA is "11001." In this case, the decoder 2 generates the logic "1". When in addition, bit 24 of the extended control register ECR is logic "1", the AND circuit 6 generates logic "1" and the AND circuit 7 generates logic "0". In this case, the output of the adder 3 is loaded into the control storage address register 4 through the select circuit 8. Note that the adder 3 adds +1 to the content of the backup control storage address register 5. Therefore, the next address of the control storage 12 is

BCSAR+1 where BCSAR is the content of the backup up control storage address register 5. At this address location in the control storage 12, a microinstruction for an interruption is stored. Thus, an interruption is generated in the control storage 12, so that the LCTL or STCTL instruction is simulated by the control program CP stored in the control storage 12.

On other hand, when the bit 24 of the extended control register ECR is logic "0", the AND circuit 6 generates logic "0" and the AND circuit 7 generates logic "1". In this case, the bits 0 through 6 of the backup control storage address register 5 and the bits 0 through 4 of NCSAL are loaded into the control storage address register 4 through the bus 11 and the select circuit 9. In this case, in the address location indicated by the control storage address register 4 will contain a microinstruction for loading data in the main storage unit (not shown) into one of the control registers or a microinstruction for storing the content of one of the control registers into the main storage unit. Thus, the LCTL or STCTL instruction is directly carried out.

Figure 3:
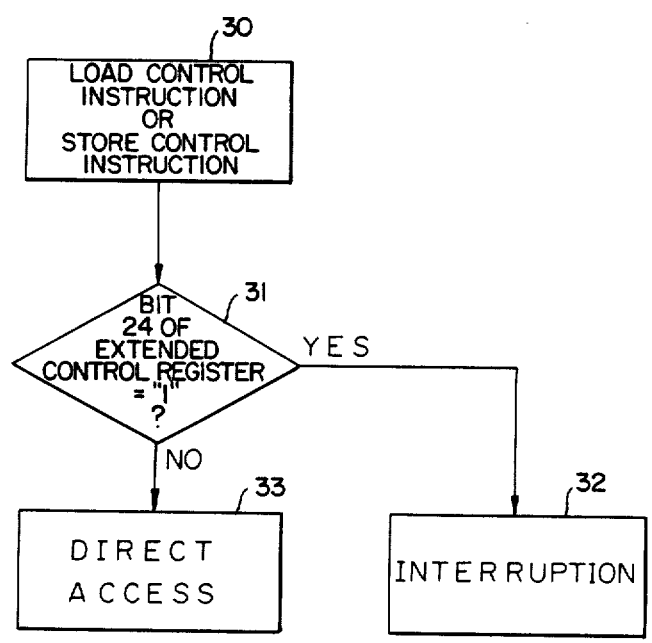
FIG. 3 is a flow chart illustrating the operation of the circuit of FIG. 2.

FIG. 3 briefly illustrates the operation of the circuit of FIG. 2. When an LCTL or STCTL instruction 30 is loaded into the micro instruction register 1, the control storage access control circuit determines whether the bit 24 of the extended control register ECR is logic "1" at step 31. If the answer is affirmative, +1 is added to the content of the backup control storage address register 5. The result is the next control storage address in which a microinstruction for initiating an interruption 32 is stored. If the above-mentioned answer is negative, a direct access 33 is performed and bits 0 through 6 of the basic control storage address register 4 and bits 0 through 3 of NCSAL serve as the next control storage address in which a load or store microinstruction is stored.

We claim:

1. A data processing system having at least two virtual machines, first and second operating systems for controlling the respective virtual machines and a supervisory operating system for controlling the first and second operating systems, comprising:

a plurality of first control registers, the first operating system being provided with access to said first control registers by the supervisory operating system;

a plurality of second control registers, the second operating system being provided with access to said second control registers by the supervisory operating system;

an extended control register having a register indication bit, the supervisory operating system writing a first value in the register indication bit of said extended control register when the first operating system runs and a second value, different from the first value, when the second operating system runs;

means, connected to said control registers and said extended control register, for accessing said control registers in response to a first control register operating instruction generated by the first operating system, when the register indication bit has the first value; and means, connected to said control registers and said extended control register, for generating an interruption in the supervisory operating system in response to a second control register operating instruction generated by the second operating system, when the register indication bit has the second value.

2. A data processing system having a control program controlling time-shaped execution of first and second programs, comprising:

processing means for processing the first, second and control programs;

a first register accessed by the first, second and control programs;

a second register accessed by the second program via the control program;

an extended control register having a control bit indicating that one of the first and second programs is running at an instantaneous time; and control means connected to said first, second and extended control registers, for accessing said first register without generating an interrupt for the control program when the control bit indicates that the first program is running and for generating an interrupt for the control program to provide access to said second register when the control bit indicates that the second program is running, said control means comprising:

a microinstruction register for storing microinstructions;

a decoder, connected to said microinstruction register, for decoding a first portion of the contents of said microinstruction register;

a first AND circuit connected to said extended control register and said decoder;

a first select circuit connected to said first AND circuit;

a control storage address register connected to said first select circuit;

a control storage, connected to said control storage address register and said microinstruction register, for storing microinstructions;

a backup control storage address register connected to said control storage address register;

an adder, connected to said backup control storage address register and said first select circuit, for adding one to the contents of said control storage address register;

a NOT circuit connected to said extended control register;

a second AND circuit connected to said decoder and said NOT circuit;

a bus, connected to said microinstruction register and said backup control storage address register, for combining a second portion of the contents of said microinstruction register with a portion of the contents of said backup control storage address register; and a second select circuit connected to said second AND circuit, said bus and said control storage address register.

* * * * *